April 29, 1930. A. J. FLEITER ET AL 1,756,058
TUBE VULCANIZER
Original Filed Feb. 24, 1927  2 Sheets-Sheet 1

INVENTORS
ANDREW J. FLEITER
HENRY O. BOSTWICK
THEODORE A. MILLER
BY
Ely r Barrow
ATTORNEYS April 29, 1930.  A. J. FLEITER ET AL  1,756,058
TUBE VULCANIZER
Original Filed Feb. 24, 1927  2 Sheets-Sheet 2
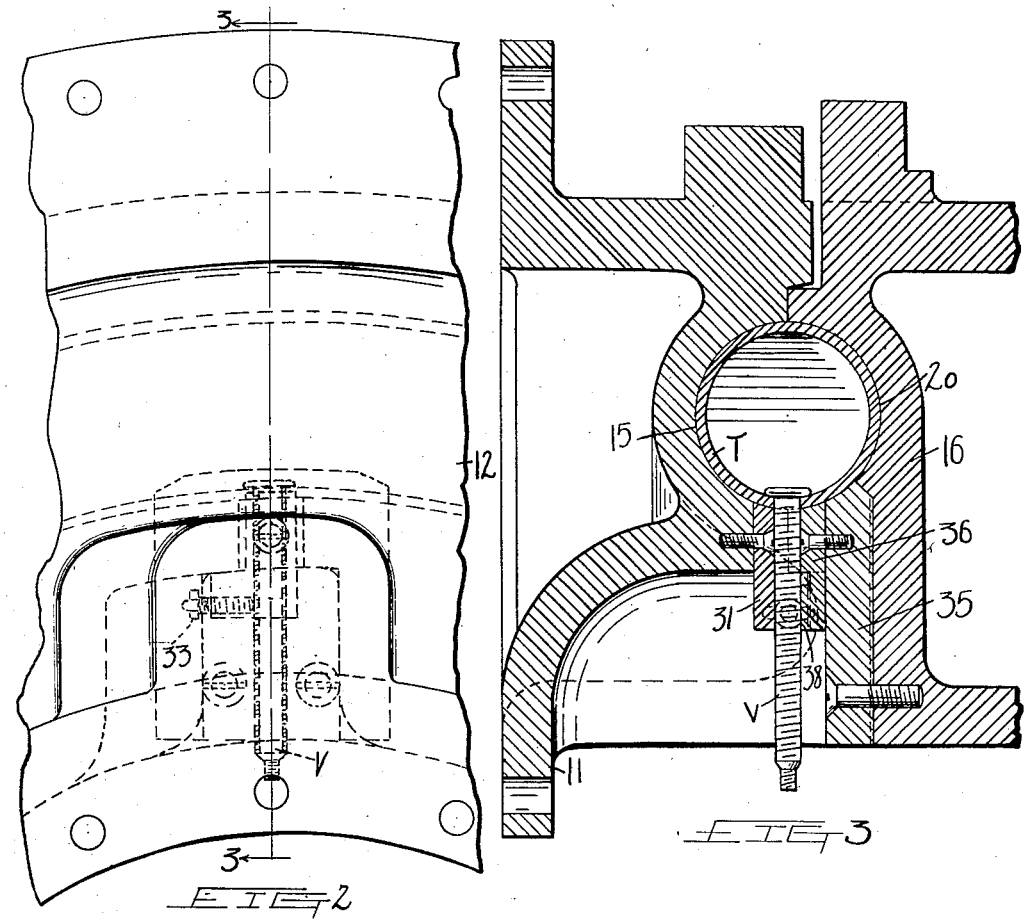
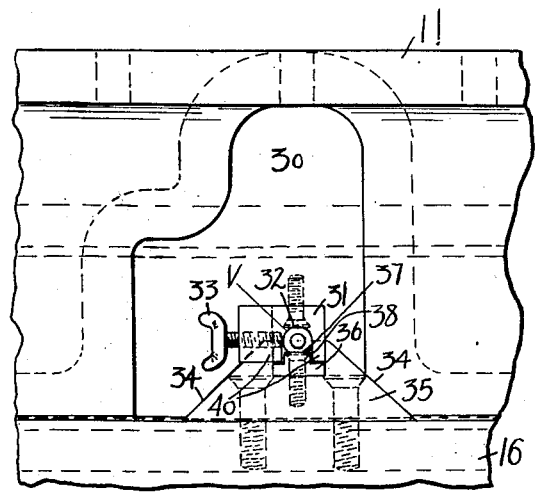
INVENTORS.
ANDREW J. FLEITER
HENRY C. BOSTWICK
THEODORE A. MILLER
BY
Ely + Barrow
ATTORNEYS.

Patented Apr. 29, 1930

1,756,058

UNITED STATES PATENT OFFICE

ANDREW J. FLEITER, OF AKRON, HENRY C. BOSTWICK, OF KENMORE, AND THEODORE A. MILLER, OF AKRON, OHIO, ASSIGNORS TO THE AKRON STANDARD MOLD COMPANY, OF AKRON, OHIO, A CORPORATION OF OHIO

TUBE VULCANIZER

Original application filed February 24, 1927, Serial No. 170,511. Divided and this application filed July 1, 1927. Serial No. 202,843.

This invention relates to new and useful improvements in vulcanizers, particularly of the type known as "watchcase vulcanizers" which are characterized by the fact that each vulcanizer comprises a central or stationary member on opposite sides of which are formed cavities for the vulcanization of tires, tubes, or the like, the cavities being closed by swinging or movable members which are brought into contact with the stationary member and locked in position. The invention is illustrated for use in the vulcanization of inner tubes, and is directed particularly to the means employed for accommodating the valve stem of the tube and tightly closing the orifice about the valve stem so as to reduce the loss occurring at this point. The invention may be utilized in vulcanizers having a single swinging or movable section or halves, as well as in the double cavity type illustrated herein.

This application is a division of prior application Serial No. 170,511, filed February 24, 1927.

It will be understood that the detailed description given herein is for the purpose of explaining the invention to those skilled in the art and is not for the purpose of limitation to the scope thereof, except as required by the prior art and as set forth in the claims hereto appended.

In the drawings which accompany this application is shown one form of the invention, in which Figure 1 is a general side view of a watchcase vulcanizer having the improvements incorporated therein;

Figure 2 is an enlarged detail of the mold at the valve stem;

Figure 3 is a section on the line 3—3 of Figure 2; and

Figure 4 is a view looking from below at the mechanism shown in Figure 2.

Figure 1:
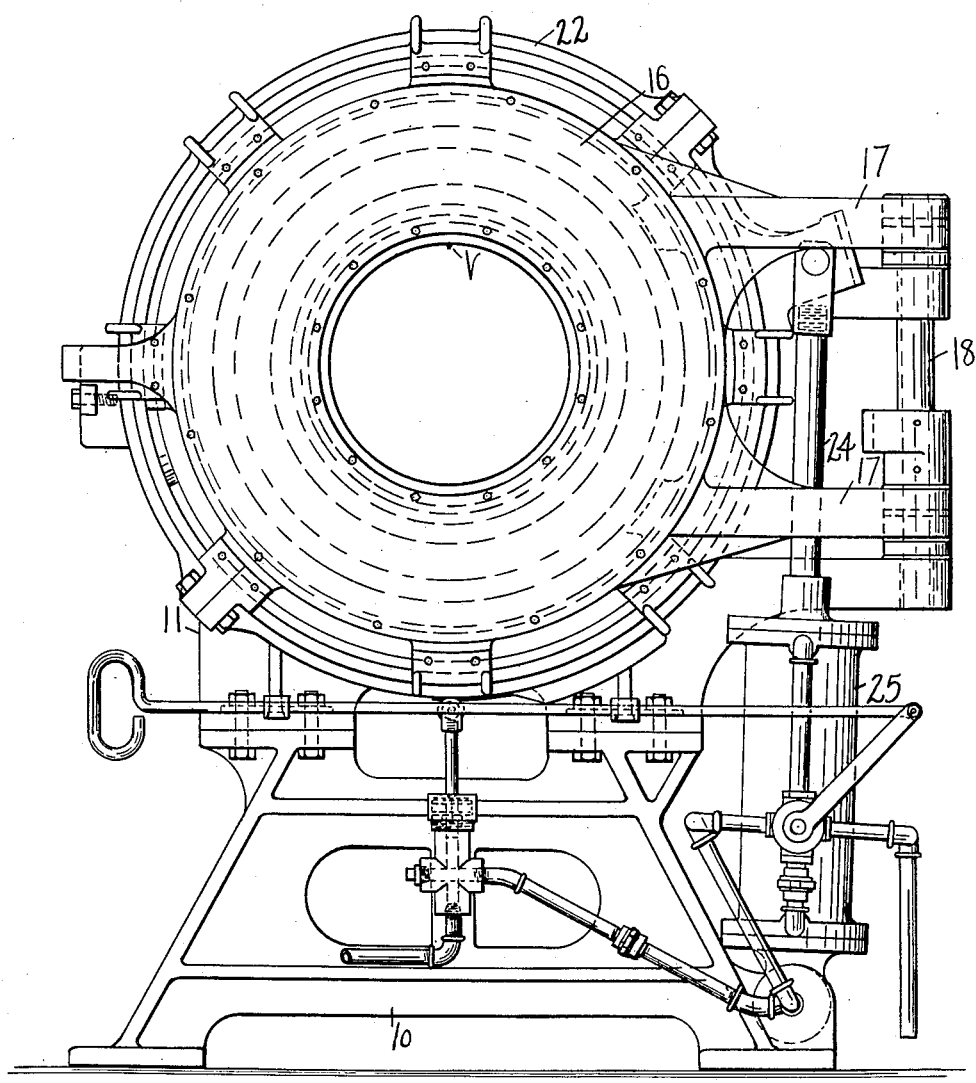

The watchcase vulcanizer is mounted upon a standard or base 10, to the upper surface of which is secured the central or stationary member 11. The outer faces of these castings are formed with cavities 15, one of which is illustrated in Figure 3, each of which constitutes one side of the vulcanizing chamber in which the articles are received. As shown in the present case, the cavity is designed for the reception and vulcanization of an inner tube T and comprises more than one-half of the transverse circumference of the inner tube.

One of the swinging or movable vulcanizer sections is shown at 16 and is formed with two parallel, aligned arms 17. In the ends of the arms are mounted vertical hinge pins 18 upon which the section moves to open and close the tube cavity. Formed on the inner surface of each movable mold section is the cavity 20, which, with the cavity 15, completes the molding space. The sections are provided with steam cavities by which they are heated to vulcanize the tube.

When the pair of mold sections is placed together, the sections are clamped in position by means of a rotary locking ring 22 on the stationary member 11, which engages the swinging section to lock the mold for the vulcanizing operation, being actuated by a piston 24 moved by a cylinder 25, pivotally mounted at the base of the machine. When the pressure fluid is admitted to the cylinder, as stated, the clamping ring is rotated in either direction, depending upon whether the mold is to be locked or opened.

The vulcanizer is designed for the purpose of curing tubes, it being desirable to provide for the accommodation of tubes of different sizes or shapes in a single vulcanizer. For this purpose, the section 11 is provided with a recess or chamber 30 at one point about its periphery and to the wall of the section is replaceably secured a plate 31 which is formed on its face with a semi-circular channel or passageway 32 for the valve stem V. The lower end of the plate 31 is enlarged somewhat, and at this point is provided with a thumb screw 33 by which the valve stem is clamped in position as may be desirable during the vulcanizing operation. When a stem of a different diameter is to be accommodated, the plate may be changed as required. The lower portion of the mold is cut away upon a generally V-shaped cut so as to obtain access to the tube, as shown at 34, and the space thus left open is closed by a correspondingly shaped block 35 secured to the movable vulcanizer section 16. The inner edge of the block 35 has secured to it a replaceable plate 36, which is provided with a complementary channel or passageway 37 which, with the passageway 32, encloses the valve stem. The lower end of the plate 36 is provided with a tongue 38 which enters the recess in the lower portion of the plate 31 formed by extensions 40 at the base of the plate 31.

It will be observed that the description of the invention has been set out with considerable detail, but changes and modifications may be made therein without departing from the scope of the invention as set forth in the claims.

What is claimed is:

1. In a vulcanizer for tubes, the combination of separable mold sections, the sections parting about the inner circumference of the tube about a line to one side of the valve stem, a recess in one of the sections, a removable plate secured in the recess, partially filling the same and having a channel for the reception of one side of the valve stem, a block secured to the other section fitting the recess, and a second removable plate secured to the block having a channel therein for the reception of the other side of the valve stem.

2. In a vulcanizer for tubes, the combination of separable mold sections, the sections parting about the inner circumference of the tube about a line to one side of the valve stem, a recess in one of the sections, a removable plate secured in the recess, partially filling the same and having a channel for the reception of one side of the valve stem, a block secured to the other section fitting the recess, and a second removable plate secured to the block having a channel therein for the reception of the other side of the valve stem, the plates having interengaging projections and recesses.

3. In a vulcanizer, a stationary section and a movable section hinged thereto, the said sections having mating cavities for the vulcanization of an inner tube, the sections parting about the inner circumference of the tube on a line outwardly of the valve stem, the stationary section having a recess with outwardly flaring side walls, a wedge-shaped projection on the movable section adapted to enter the said recess, and removable plates on said projection and in said recess to close the inner surface of the cavity about the valve stem whereby different sized valve stems can be accommodated.

ANDREW J. FLEITER.
HENRY C. BOSTWICK.
THEODORE A. MILLER.